No. 876,933. PATENTED JAN. 21, 1908.
J. L. BORSCH, Jr.
BIFOCAL LENS.
APPLICATION FILED JAN. 23, 1904.

WITNESSES:

INVENTOR:

UNITED STATES PATENT OFFICE.

JOHN L. BORSCH, JR., OF PHILADELPHIA, PENNSYLVANIA, ASSIGNOR, BY MESNE ASSIGNMENTS, TO KRYPTOK COMPANY, A CORPORATION OF NEW YORK.

BIFOCAL LENS.

No. 876,933.   Specification of Letters Patent.   Patented Jan. 21, 1908.

Application filed January 23, 1904. Serial No. 190,257.

*To all whom it may concern:*

Be it known that I, JOHN L. BORSCH, Jr., a citizen of the United States, residing in the city and county of Philadelphia, State of Pennsylvania, have invented certain new and useful Improvements in Bifocal Lenses, of which the following is a specification.

My invention relates to lenses employed in spectacles, eye-glasses, and other optical instruments, of that class having a plurality of independent focal points. The lenses embodying my invention include regions which are formed of such material that their respective indices of refraction are of dissimilar power.

Lenses of this construction are employed in spectacles and eye-glasses by persons whose vision is of such a character that a lens which enables them to see objects located at a certain distance from the eyes does not enable them to see objects located at a different distance, either greater or less, from the eyes. Such persons are under the necessity either of employing a plurality of pairs of glasses, a separate pair for different selected distances, or of employing lenses of the character above set forth having a plurality of distinct regions having dissimilar or different powers of refraction, and consequently a plurality of independent focal points.

Heretofore, lenses of the latter character have been constructed of two or more separate pieces of glass, cemented together by means of a suitable cement, for instance, Canada balsam, the said pieces of glass having different indices of refraction.

Generically considered, my invention consists of a lens formed of a single integral piece of glass having a plurality of regions therein, of different or dissimilar refractive power, and my invention also comprehends or consists in the process or method by means of which such a lens is produced.

In the manufacture of my lens, I may take a piece of glass having suitable dimensions, the said glass being composed of ordinary lens material, such as Crown glass, and form a depression therein, and then take a piece of glass having a different index of refraction, and grind the same so that it will fit in the said depression and place it therein and subject the whole to a temperature or heat sufficient to occasion coalescence of the two pieces of glass, that is, subject the same to a temperature sufficient to cause the two pieces of glass to fuse together to form a single, integral, homogeneous plate of glass.

If it is not desired to form a depression in the larger piece of glass, a smaller piece of glass may be laid upon the smooth surface of the larger glass, after which by subjecting the two glasses to a temperature such as above indicated, they are fused or welded into a single, integral piece of glass.

The latter method of construction or manufacture may be employed, though the first method referred to is preferable.

Instead of laying one piece of glass upon another, the edges of two or more pieces of glass may be brought into contact and held in that position, while they are subjected to heat as above indicated, to cause the edges to unite to form a single integral and homogeneous piece of glass out of which a lens may be formed by grinding in the same manner as in the two previous constructions referred to.

It will be understood that the lenses may be ground to the desired curvature or form, the same as is usual in the manufacture of spectacle, eye-glass, and other optical lenses.

Referring to the drawings forming a part of this specification:—Figure 1 is a plan view of a plate showing in outline a smaller portion or section of plate, the two plates having different indices of refraction;

Figure 1:
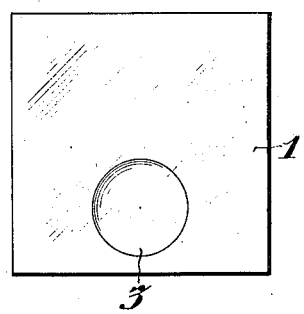
Figures 2, 3:
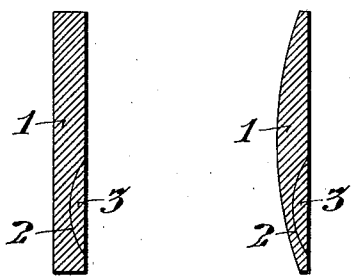
Figure 2 is a central transverse section of the plates shown in Figure 1.
Figure 3 is a section of a spherical lens formed from the plate shown in Figure 1.

In Figures 1 to 3 of the drawings,—1 designates a piece of glass of a selected index of refraction having a depression 2 therein, which is adapted to receive a piece of glass 3 having a selected index of refraction different from that of the index of refraction of the main or body portion of the glass 1. The refractive power of the portion of glass 3 combined with the refractive power of the portion of the glass 1 which overlies the portion 3 produces a net coefficient of refraction distinct from that of the remaining portion of the glass and may be of any desired power.

It will be understood that the depression is formed in the body portion of the glass 1 while the same is cold, and that the smaller piece is ground to a form to fit into the said depression. Afterwards the parts are assembled and the whole subjected to a heating process for the purpose of raising the temperature to a point sufficient to occasion the fusion or welding of the two pieces of glass together to form a single, integral piece of glass which may be ground to any curvature or form desired, as for instance spherical, as illustrated in Figure 3.

Figure 4:
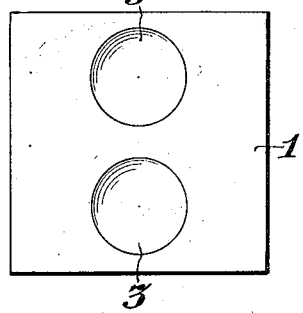
Figure 4 is a plan view of a plate of glass having two smaller portions or sections of glass embedded in the surface thereof, the three pieces of glass having dissimilar or different indices of refraction.
Figures 5, 6:
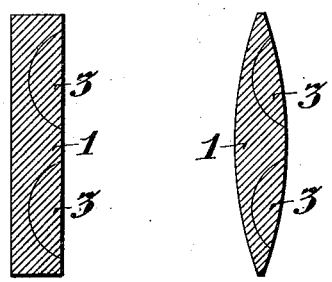
Figure 5 is a transverse section through the three pieces of glass shown in Figure 4.
Figure 6 is a section of a double convex lens formed from the plate shown in Figure 4.

The construction shown in Figures 4, 5, and 6 is substantially the same as that shown in Figures 1 to 3, the only difference being that two different pieces of glass 3, each having a different index of refraction, are shown as embedded in the surface of the main or body portion 1 of the glass from which the lens is formed, the said body portion having an index of refraction differing from that of the pieces 3. In the latter construction illustrated in Figures 4, 5, and 6, a lens is formed having three independent focal points, while in the form of construction illustrated in Figures 1 to 3, inclusive, a lens is formed having two independent focal points.

Figure 7:
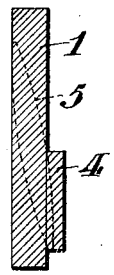
Figure 7 is a section corresponding to the section shown in Figure 2, but indicating a slightly modified method of construction.
Figure 8:
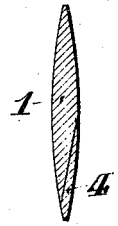
Figure 8 is a section of a double convex lens formed from the plate shown in Figure 7.

As illustrated in Figure 7, the method of manufacture is somewhat different from that shown in the preceding Figures 1 to 6 of the drawings, the difference being that in the form of construction shown in Figure 7, the piece of glass 4 is laid upon the smooth surface of the main or body portion 1 of the glass from which the lens is formed, after which the two pieces are subjected to heat in the same manner as in the constructions illustrated in Figures 1 to 6, whereby the fusing or welding together of the two pieces of glass is effected, after which the lens may be formed by grinding to any suitable curvature or form which may be desired. The dotted lines 5 shown in Figure 7 indicate the outline of a double convex lens, such a lens being shown in full lines in Figure 8.

Figure 9:
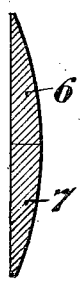
Figure 9 is a transverse section of a spherical lens formed from a piece of glass having its edges welded or secured together by the application of heat; and, Figure 10 is a transverse section of a prismatic glass having two portions of glass secured together in the same manner as is the case in Figure 9.
Figure 10:
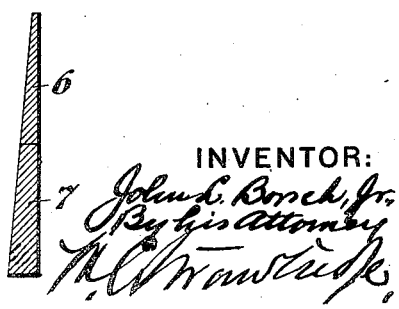

Figures 9 and 10 designate a form of construction in which two pieces of glass, 6 and 7, each having a different index of refraction, are placed in contact edge to edge and subjected to a heat sufficient to weld or fuse the edges together to form an integral structure, after which they may be ground spherical, as indicated in Figure 9, prismatic, as indicated in Figure 10, or to any other suitable curvature or form as may be desired.

The line of junction or connection between the portions of glass of different refractive power embodied in the lenses is clearly indicated in the several figures of the drawings.

It will be understood that any suitable furnace or other means may be employed for subjecting the glass to heat to raise the same to the temperature necessary to occasion a coalescence or welding together of the separated pieces of glass in the process of manufacturing eye-glass or other optical lenses embodying my invention.

Having thus described my invention, I claim:—

1. An optical glass lens consisting of an integral piece of glass ground with even surfaces and having a plurality of independent focal points.

2. A spectacle, eye-glass, or other optical lens consisting of an integral piece of glass, different portions of which have different indices of refraction.

3. A spectacle, eye-glass, or other optical lens consisting of a body portion having a selected index of refraction, and one or more portions of glass embedded in the surface of the said body portion and integral therewith, the said embedded portion or portions having an index or indices of refraction different from that of the main or body portion.

4. An optical glass lens consisting of a main or body portion having a selected index of refraction, a plurality of portions of glass embedded in the surface of the said body portion, the said embedded portions being integral with the body portion, said embedded portions having different indices of refraction, the said indices of refraction being also different from that of the main or body portion.

5. A lens consisting of an integral piece of glass, different parts of which have different indices of refraction, and merge into each other along their adjacent edges only.

6. A lens consisting of a major part or body portion having a certain index of refraction and a minor part having a different index of refraction, said parts being fused or welded to each other along their adjacent edges only, and having no overlapping portions on the face of either.

7. A bifocal lens consisting of a body of glass of any refractive power and a portion of glass integral therewith and having a refractive power which is different from that of said body of glass.

8. A bifocal lens consisting of a body of glass or similar substance of any refractive power, and a portion of glass or similar substance of different refractive power secured by fusion to the said body of glass or similar substance.

In testimony that I claim the foregoing as my invention, I have hereunto signed my name this 19th day of January A. D. 1904.

JOHN L. BORSCH, Jr.

In presence of—
 THOS. K. LANCASTER,
 LAURA KLEINFELDER.